United States Patent
Sundararajan et al.

(10) Patent No.: US 7,232,187 B1
(45) Date of Patent: Jun. 19, 2007

(54) HEAD RESTRAINT FOR AUTOMOTIVE VEHICLE

(75) Inventors: Srinivasan Sundararajan, Ann Arbor, MI (US); Joseph Mazur, Washington, MI (US); Edward Burley, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/278,083

(22) Filed: Mar. 30, 2006

(51) Int. Cl.
    *B60R 22/28* (2006.01)
(52) U.S. Cl. ........................ 297/410; 297/391
(58) Field of Classification Search ............... 297/410, 297/391, 409, 407; 280/753, 735
    See application file for complete search history.

(56) References Cited

U.S. PATENT DOCUMENTS

| | | | |
|---|---|---|---|
| 3,311,413 A * | 3/1967 | Martens ....................... 297/410 |
| 4,645,233 A | 2/1987 | Bruse et al. |
| 4,797,824 A | 1/1989 | Sugiyama et al. |
| 4,935,680 A | 6/1990 | Sugiyama |
| 5,080,436 A * | 1/1992 | Meiller ........................ 297/391 |
| 5,288,129 A * | 2/1994 | Nemoto ...................... 297/410 |
| 5,835,613 A | 11/1998 | Breed et al. |
| 5,845,000 A | 12/1998 | Breed et al. |
| 5,846,661 A | 12/1998 | Fu |
| 5,882,060 A * | 3/1999 | Walk et al. .............. 296/65.01 |
| 5,924,755 A | 7/1999 | Muller |
| 5,975,637 A | 11/1999 | Geuss et al. |
| 6,024,378 A | 2/2000 | Fu |
| 6,088,640 A | 7/2000 | Breed |
| 6,490,515 B1 | 12/2002 | Okamura et al. |
| 6,511,130 B2 | 1/2003 | Dinkel et al. |
| 6,749,257 B2 | 6/2004 | Muller |

FOREIGN PATENT DOCUMENTS

DE    102005010594    * 9/2006

\* cited by examiner

*Primary Examiner*—Milton Nelson, Jr.
(74) *Attorney, Agent, or Firm*—Frank A. MacKenzie; Artz & Artz, P.C.

(57) ABSTRACT

A head restraint system for an automotive vehicle seat includes a headrest carried upon eccentric mounting posts which may be extended telescopically from a seatback and rotated about their base axes so as to reposition the headrest not only vertically, but also horizontally. A sensor mounted in the headrest feeds back the location of an occupant's head to a system controller.

14 Claims, 3 Drawing Sheets

HEAD RESTRAINT FOR AUTOMOTIVE VEHICLE

TECHNICAL FIELD

The present invention relates to an automotive head restraint system including a headrest with motor driven adjustments for both the height and the horizontal position of the headrest.

BACKGROUND

Adjustable headrests have been used for many years in automotive vehicles. For optimum effectiveness, such headrests must be adjusted properly. Because achieving a correct adjustment is more difficult in the case of manually adjustable headrests, motor drive headrests have been offered. U.S. Pat. No. 6,511,130 discloses a headrest which is adjustable both manually, and by means of a motor. The arrangement of the '130 patent is however, very complex, costly, and high in weight.

The present head restraint system for an automotive vehicle occupies a package of reasonable volume, with reasonable weight, and low complexity.

SUMMARY

A head restraint system for an automotive vehicle includes a plurality of mounting posts extending generally vertically from a seatback, with each of the posts having a lower base portion with a longitudinal axis, and an upper eccentric portion. A headrest is carried upon the eccentric portion of each of the posts. A first drive mechanism, which is coupled to the base portion of each of the mounting posts, extends and retracts the posts so as to raise and lower the headrest. A second drive mechanism rotates the mounting posts about their longitudinal axes, so as to move the eccentric portions and the attached headrest fore and aft. The first drive mechanism preferably includes a height control bar having a mounting plate for the base portions of the headrest posts, and a linear actuator coupled to the height control bar. The actuator moves the height control bar and mounting posts vertically. This linear actuator may include a lead screw powered by an electric motor.

According to another aspect of the present invention, a second drive mechanism for a head restraint system according to the present invention includes a plurality of linear actuators, with a separate one of the linear actuators being coupled to the base portion of each mounting post, and with the linear actuators being controlled so as to move the mounting posts laterally in opposite directions. Because the mounting posts are connected within the headrest by an indexing mechanism extending between the mounting posts, the lateral movement produced by the linear actuators will cause the mounting posts to rotate equally, but in opposite directions, thereby moving the headrest either fore or aft at a constant attitude, and in a direction depending upon the direction of rotation of the mounting posts. Of course, the direction of rotation depends upon whether the mounting posts have been moved closer to, or farther from, each other by the action of the linear actuators. In a preferred embodiment the indexing mechanism comprises a plurality of secondary gears meshing between primary gears locked rotationally to each of the mounting posts.

According to another aspect of the present invention, a controller for operating the first and second drive mechanisms of the headrest mounting system includes either a manual controller or a microprocessor controller having at least a first sensor for determining an operating state of the vehicle, and a second sensor for determining the position of a passenger's head with respect to the headrest. In a preferred embodiment, a second sensor which may be advantageously mounted within the headrest itself.

According to another aspect of the present invention, a seat for an automotive vehicle includes a seat frame, a seat cushion mounted to the seat frame, a seatback mounted to the seat frame, and a plurality of mounting posts extending generally vertically from the seatback, with each of the mounting posts having a lower base portion with a longitudinal axis and an upper eccentric portion. A headrest is mounted to and carried upon the eccentric portions of the posts. A first drive mechanism, coupled to the base portion of each of the mounting posts, extends and retracts the posts so as to raise and lower the headrest. A second drive mechanism moves the posts laterally, so as to cause rotation of the posts and to thereby move the eccentric portions of the posts, and the attached headrest, fore and aft.

A seat according to the present invention further includes a sensor for determining the position of a passenger's head with respect to the headrest and a controller for operating the first and second drive mechanisms so as to adjust the position of the headrest to establish a predetermined spatial relationship between the headrest and the passenger's head.

According to another aspect of the present invention, a method for adjusting a passenger headrest in an automotive vehicle includes the steps of activating a head proximity sensor located in the headrest, activating a first drive mechanism to adjust the vertical position of the headrest based upon a signal from the proximity sensor, and activating a second drive mechanism to adjust the horizontal position of the headrest based upon the signal from the proximity sensor.

It is an advantage of a system according to the present invention that a passenger headrest in a vehicle may be adjusted either manually or automatically with precision, so as to achieve a desired position offering enhanced protection for a vehicle occupant.

It is a further advantage of the present invention that the present headrest adjusting system provides enhanced functionality with minimum cost and weight.

It is a further advantage of a system according to the present invention that the present headrest adjusting system may be fully contained within a seat of a vehicle, without the need for external electronic logic support.

Other advantages, as well as features and objects of the present invention will become apparent to the reader of this specification.

DETAILED DESCRIPTION OF THE PREFERRED EMBODIMENTS

Figure 1:
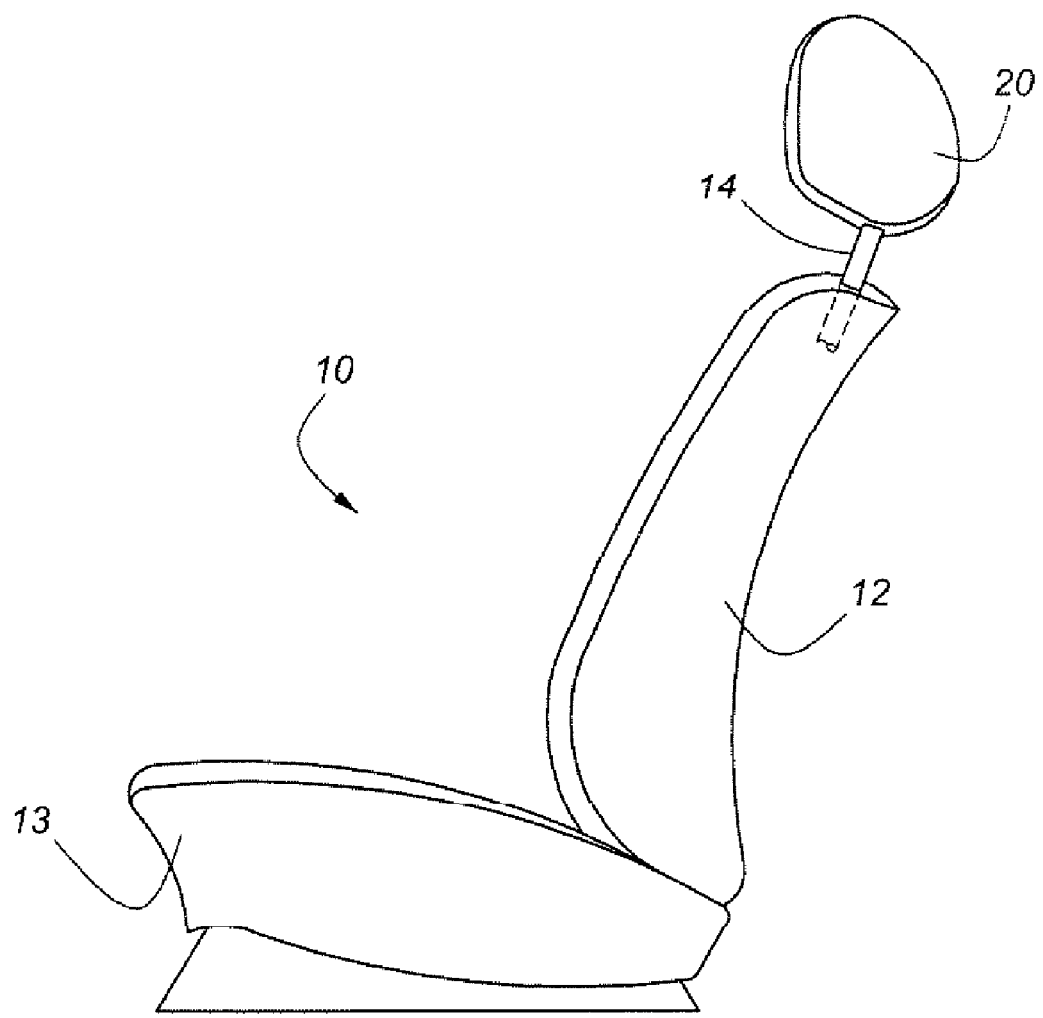
FIG. 1 is a schematic representation of an automotive seat according to the present invention.

As shown in FIG. 1, seat 10 has seat cushion 13 and seatback 12, incorporating a headrest adjustment mechanism which positions headrest 20 upon mounting posts 14. One such post 14 is shown in FIG. 1.

Figure 2:
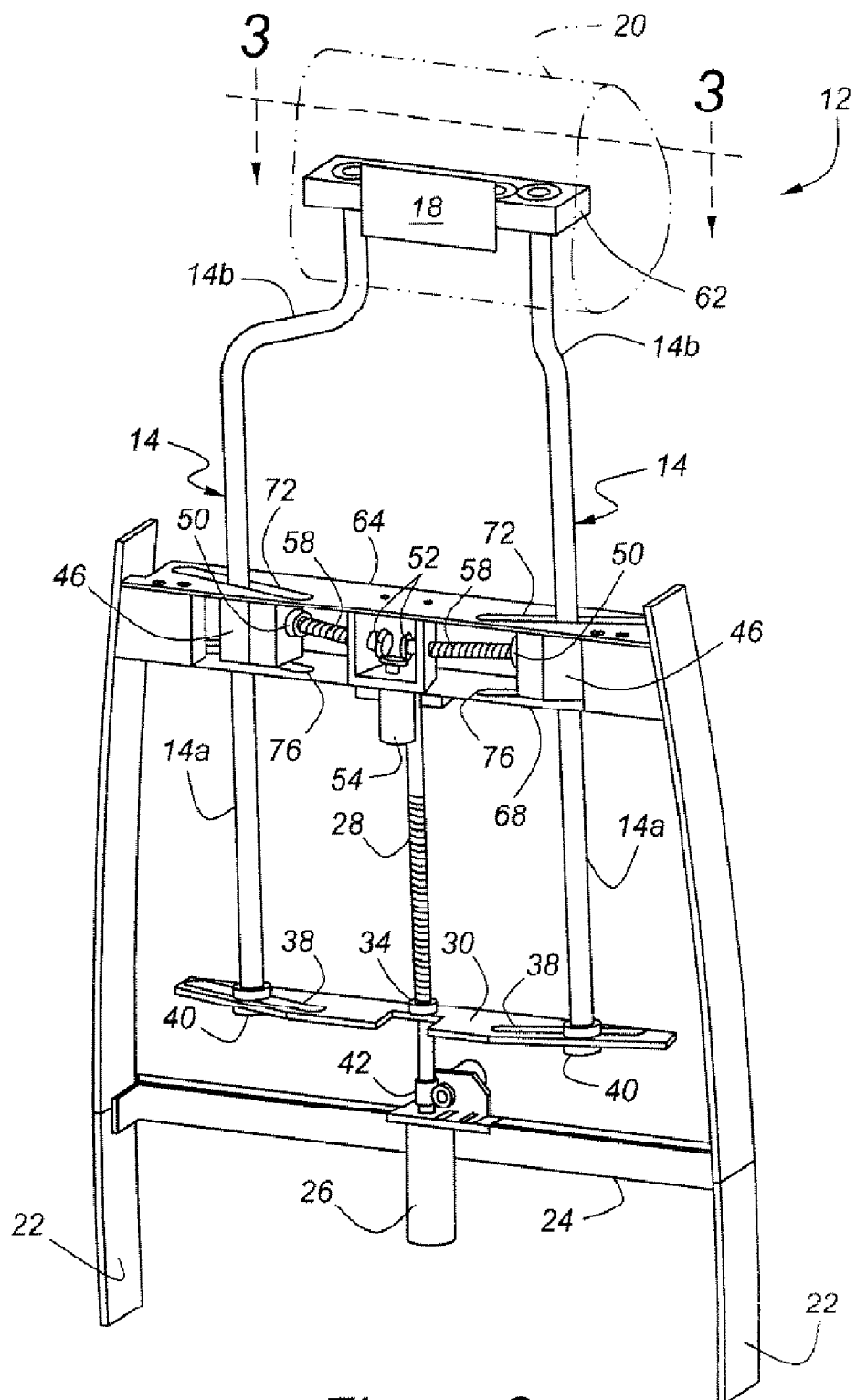
FIG. 2 is a perspective view of a headrest adjusting mechanism according to the present invention.

As shown in FIG. 2, mounting posts 14 provide a foundation for the present headrest adjusting mechanism. Each of posts 14 has a base portion, 14a, and an eccentric portion, 14b. Base portions 14a extend within seatback 12. The lowermost portions of mounting posts 14 are attached to height control bar 30. The attachment of posts 14a to height control bar 30 is facilitated by post bushings 40, which are fitted so as to accommodate movement in a slots 38 which are provided within two portions of height control bar 30. As explained more fully below, slots 38 allow lateral movement of mounting posts 14, so as to facilitate fore and aft movement of headrest 20.

The vertical positioning of mounting posts 14 is facilitated by elevation motor 26, which drives lead screw 28 through nut 34, which is attached to height control bar 30. Motor 26 is attached to motor mounting bracket 24, which extends between sides 22 of the seat frame. As motor 26 turns in response to command from a controller, lead screw 28 will turn within nut 34, which will cause height control bar 30 to move either up or down, thereby moving mounting posts 14 and headrest 20 up or down as commanded.

System controller 90 (FIG. 4) reads the actual height of headrest 20 by means of height control sensor 42, which may, for example, be a multi-turn potentiometer geared to either motor 26 or to lead screw 28. Those skilled in the art will appreciate in view of this disclosure that other types of position sensors, such as a linear potentiometer or a linear variable differential transformer may be used with a system according to the present invention. The measured height of headrest 20 is compared with the position of the passenger's head, which is detected by sensor 18. Although occupant sensor 18 is preferably of the capacitive type, the present system may utilize other types of sensors known to those skilled in the art and suggested by this disclosure.

Mounting posts 14 extend generally vertically through post bearings 46 which are mounted at the upper portion of seat frame 22. As with the lowermost portions of mounting post 14, the middle portions of posts 14 extending through post bearings 46 may be displaced laterally in response to the fore and aft adjusting mechanism. This lateral movement is allowed by slots 72 formed in upper angle plate 64 and slots 76 formed in lower angle plate 68. Fore and aft motor 54 rotates a set of three bevel gears 52, so as to drive two lead screws 58 which are driven into nuts, 50, housed within post bearings 46.

Figure 3:
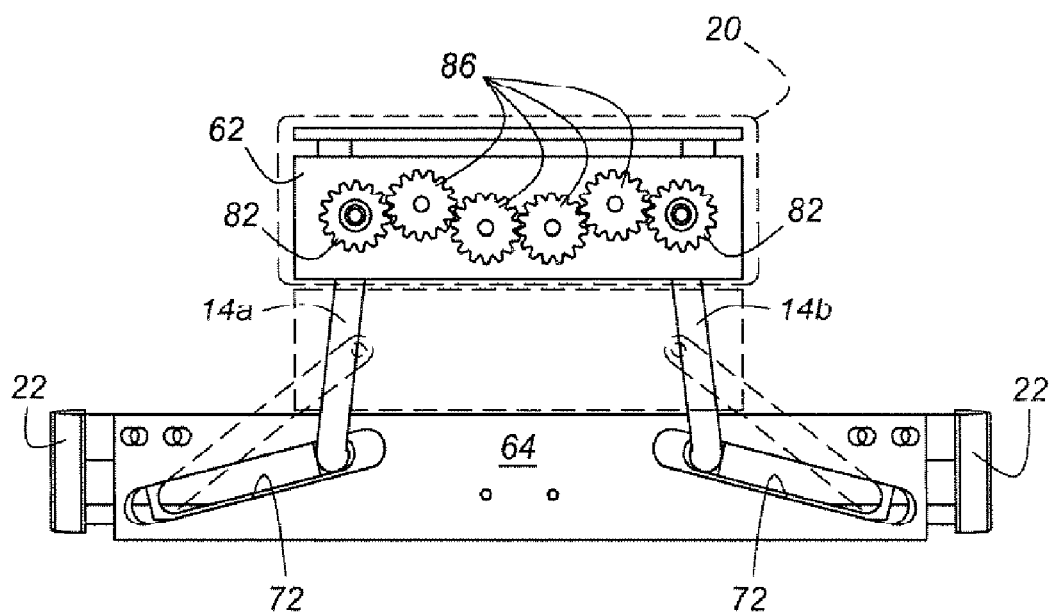
FIG. 3 is a plan view of the top or upper portion of the present headrest adjusting system, taken in the direction of line 3-3 of FIG. 2.

When motor 54 rotates, mounting posts 14 will be moved either closer to each other or away from each other by the action of lead screws 58. In the event that mounting posts 14 are moved closer to each other, headrest 20 will be caused to move closer to the passenger's head. This results from the kinematics shown in FIG. 3, where it is seen that as base portions 14a move inwardly in slots 72 formed in upper angle plate 64, eccentric portions 14b are rotated forwardly because of their linkage within headrest 20. During rotation of mounting posts 14, primary gears 82, which are rotationally locked to eccentric portions 14b of posts 14, will rotate with eccentric portions 14b, and secondary gears 86, which are imposed between primary gears 82, will assure that rotation of each of mounting posts 14 is equal. This indexing mechanism will maintain the desired parallel relationship between the seatback and headrest 20.

Figure 4:
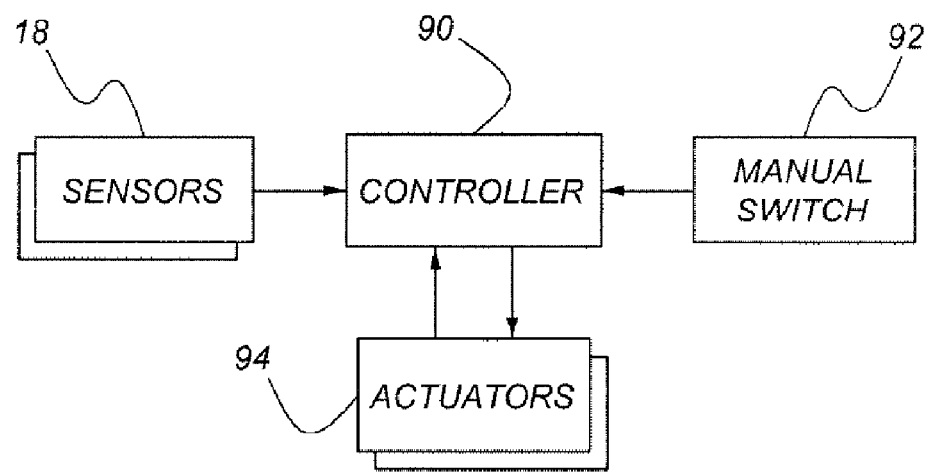
FIG. 4 is a block diagram of a control system suitable for use with a headrest adjusting system according to the present invention.

Controller 90, which is shown in FIG. 4, may be drawn either from a class of microprocessor controllers commonly employed to operate vehicular seating systems, or from other types of controllers known to those skilled in the art and suggested by this disclosure. In any event, operation of controller 90 to adjust headrest 20 may be initiated either by manual switch 92 or by feedback provided by sensor 18. Sensor 18 may include a proximity sensor, such as a capacitive sensor mounted within headrest 20. Other sensors useful with the present invention may include sensors measuring vehicle parameters, such as transmission gear selection and occupant sensing. In general, controller 90 will cause headrest 20 to be adjusted only if the seat 10 is occupied and if the vehicle is in a forward drive gear. If, on the other hand, the vehicle is in a reverse drive gear, or in park, headrest 20 may be placed in its lowermost and rearmost position, so as to promote the driver's ability to view the surrounding landscape through the back window of the vehicle.

As further shown in FIG. 4, controller 90 operates a plurality of actuators 94, which include the actuators driven by elevation motor 26 and fore and aft motor 54.

According to a final aspect of the present invention, a method for adjusting a passenger headrest in an automotive vehicle includes the steps of activating a head proximity sensor located in the headrest, and activating a first drive mechanism to adjust the vertical position of the headrest based upon a signal from the proximity sensor. The present method further includes the step of activating a second drive mechanism to adjust the horizontal position of the headrest based upon the signal from the proximity sensor.

While particular embodiments of the invention have been shown and described, numerous variations and alternate embodiments will occur to those skilled in the art. Accordingly, it is intended that the invention be limited only in terms of the appended claims.

What is claimed is:

1. A head restraint system for an automotive vehicle, comprising:
    a plurality of mounting posts extending generally vertically from a seatback, with each of said posts having a lower base portion with a longitudinal axis and an upper eccentric portion;
    a head rest carried upon said eccentric portion of said posts;
    a first drive mechanism, coupled to said base portion of each of said mounting posts, for extending and retracting said posts, so as to raise and lower said head rest;
    a second drive mechanism for rotating said posts about said longitudinal axes, so as to move said eccentric portions and said head rest fore and aft and a controller for operating said first drive mechanism and said second drive mechanism.

2. A head restraint system according to claim 1, wherein said first drive mechanism comprises:
    a height control bar having said base portions of said posts mounted thereto; and
    a linear actuator, coupled to said height control bar, for moving the height control bar and said mounting posts vertically.

3. A head restraint system according to claim 2, wherein said linear actuator comprises a lead screw powered by an electric motor.

4. A head restraint system according to claim 1, wherein said second drive mechanism comprises:

a plurality of linear actuators, with a separate one of said linear actuators being coupled to the base portion of each of said mounting posts, with said linear actuators being controlled so as to move said mounting posts laterally in opposite directions.

5. A head restraint system according to claim 4, wherein each of said linear actuators comprises a lead screw powered by a common electric motor.

6. A head restraint system according to claim 4, further comprising an indexing mechanism extending between said mounting posts.

7. A head restraint system according to claim 6, wherein said indexing mechanism comprises a gear train comprising primary gears locked rotationally to each of said mounting posts and a plurality of secondary gears in mesh with said primary gears.

8. A head restraint system according to claim 1, wherein said controller comprises a manual controller.

9. A head restraint system according to claim 1, wherein said controller comprises a controller having at least a first sensor for determining an operating state of a vehicle and a second sensor for determining a position of a passenger's head with respect to said head rest.

10. A head restraint system according to claim 9, wherein said controller moves said head rest to its lowest and rearmost position if a vehicle within which the head restraint system is installed is in one of park and reverse.

11. A head restraint system according to claim 9, wherein said second sensor comprises a capacitive sensor.

12. A head restraint system according to claim 9, wherein said second sensor comprises a capacitive sensor housed within said head rest.

13. A method for adjusting a passenger headrest in an automotive vehicle, comprising the steps of:
    activating a head proximity sensor located in said headrest;
    activating a first drive mechanism to adjust the vertical position of the headrest based upon a signal from said proximity sensor; and
    activating a second drive mechanism to adjust the horizontal position of the headrest based upon said signal from said proximity sensor, wherein said first drive mechanism telescopically extends a plurality of headrest mounting posts in a generally vertical direction, and said second drive mechanism causes said mounting posts to rotate such that eccentrics incorporated in said headrest mounting posts reposition the headrest in a horizontal direction.

14. A seat for an automotive vehicle, comprising:

a seat frame;

a seat cushion mounted to said seat frame;

a seatback mounted to said seat frame;

a plurality of mounting posts extending generally vertically from said seatback, with each of said posts having a lower base portion with a longitudinal axis and an upper eccentric portion;

a head rest mounted to said eccentric portion of said posts;

a first drive mechanism, coupled to said base portion of each of said mounting posts, for extending and retracting said posts, so as to raise and lower said head rest;

a second drive mechanism for rotating said posts about said longitudinal axes, so as to move said eccentric portions and said head rest fore and aft and a sensor for determining a position of a passenger's head with respect to said head rest, and a controller for operating said first drive mechanism and said second drive mechanism so as to adjust the position of said head rest to establish a predetermined spatial relationship between the head rest and the passenger's head.

* * * * *